Nov. 21, 1939.  G. T. FIELDING  2,180,408

GLASS WASHING MACHINE

Filed Jan. 16, 1936  3 Sheets-Sheet 1

INVENTOR.
George T. Fielding,
BY
Hood + Hahn.
ATTORNEYS.

Nov. 21, 1939.   G. T. FIELDING   2,180,408
GLASS WASHING MACHINE
Filed Jan. 16, 1936   3 Sheets-Sheet 3

INVENTOR.
BY George T. Fielding,
Hood + Hahn.
ATTORNEYS.

Patented Nov. 21, 1939

2,180,408

UNITED STATES PATENT OFFICE 2,180,408

GLASS WASHING MACHINE

George T. Fielding, Stamford, Conn.

Application January 16, 1936, Serial No. 59,340

3 Claims. (Cl. 15—75)

My invention relates to apparatus for and method of cleansing glass ware or other receptacles, such for instance as drinking glasses, sundae glasses and other glasses particularly of that character used in soda fountain and other beverage dispensing places.

One of the objects of my invention is to provide a machine which will permit of a thorough cleansing and washing of glasses of all types, sizes and shapes and this in an expeditious and rapid manner.

Another object of my invention is to provide an improved method of washing glasses and glass ware whereby necessity for manually drying the glass is obviated and at the same time the glass when dried will be in a perfectly clean and crystal clear condition.

For the purpose of disclosing my invention, I have illustrated an embodiment thereof in the accompanying drawings in which Fig. 1 is a plan view of an apparatus embodying my invention;

Figure 1:
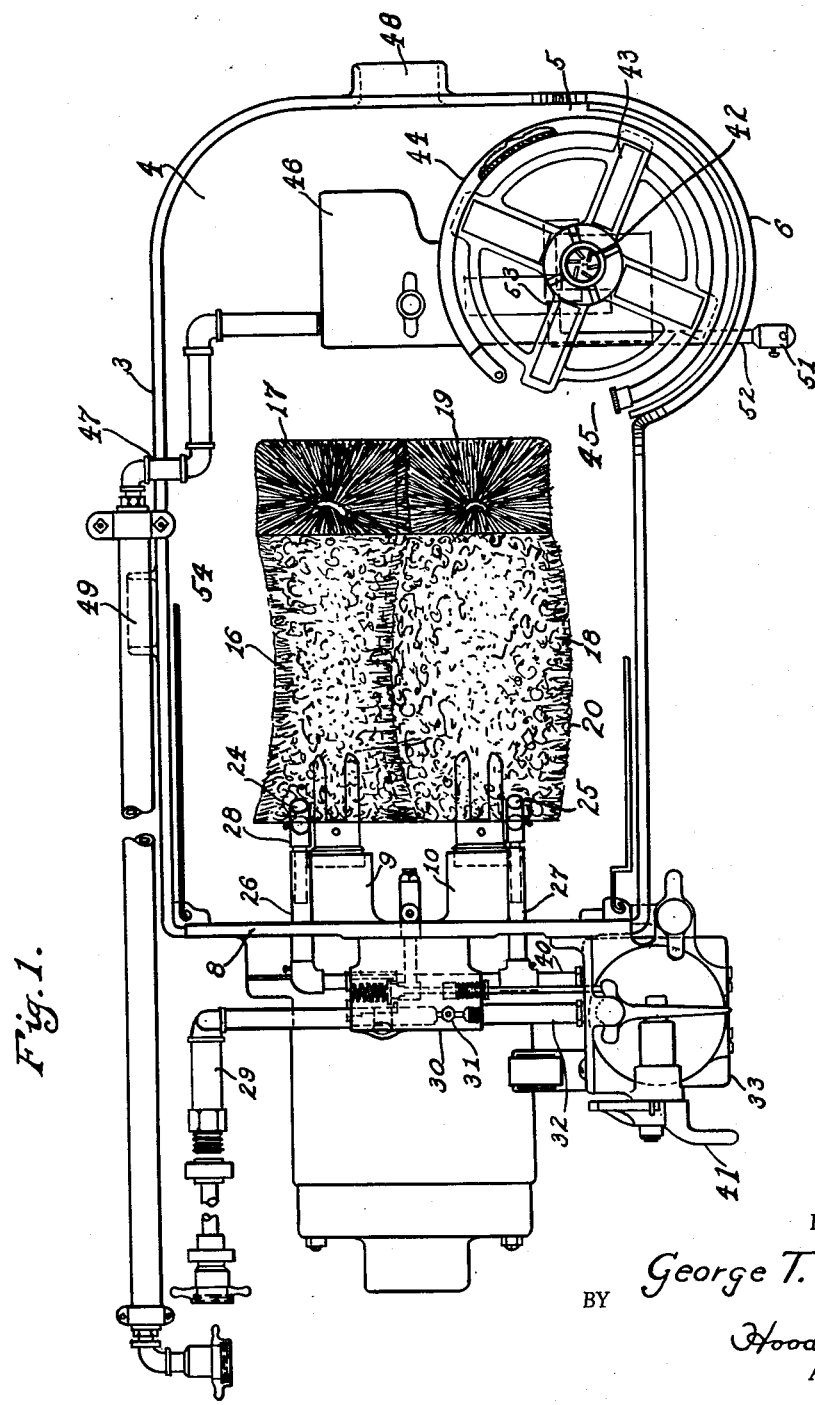
Figure 2:
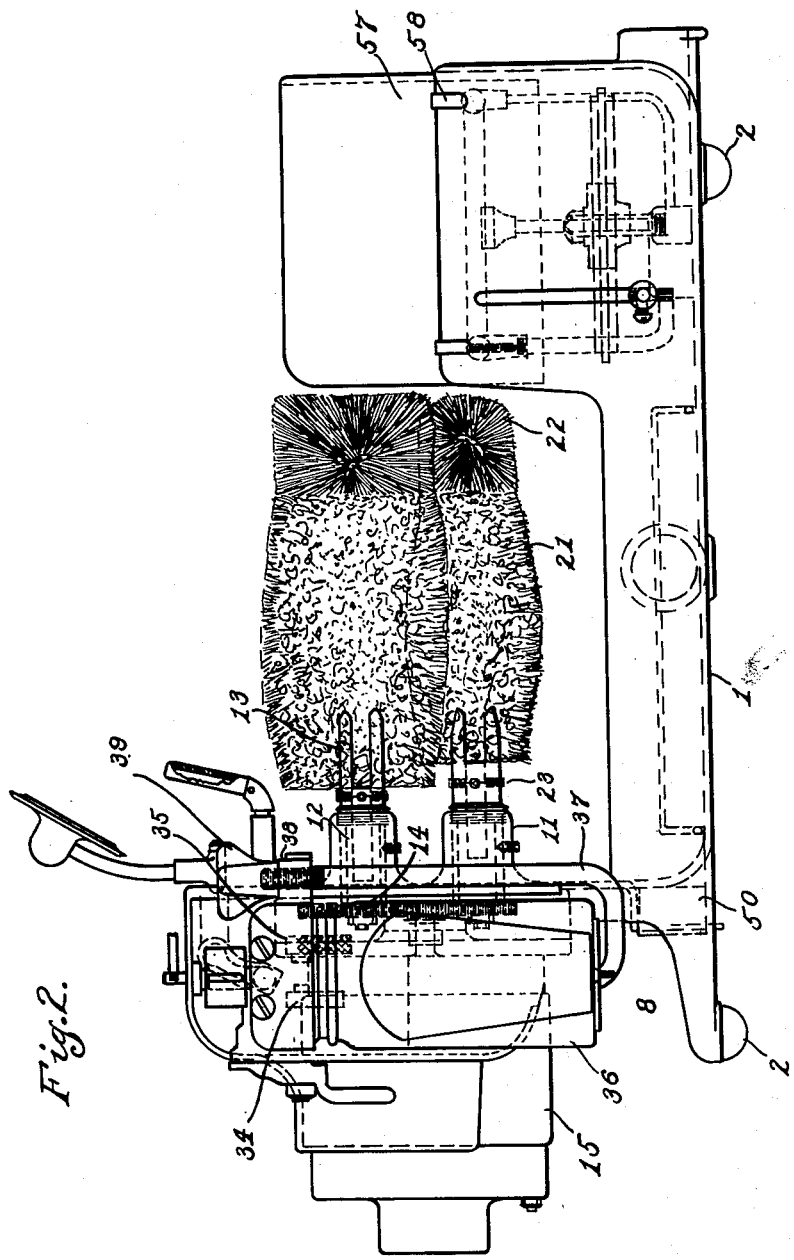
Fig. 2 is a side elevation thereof.
Figure 3:
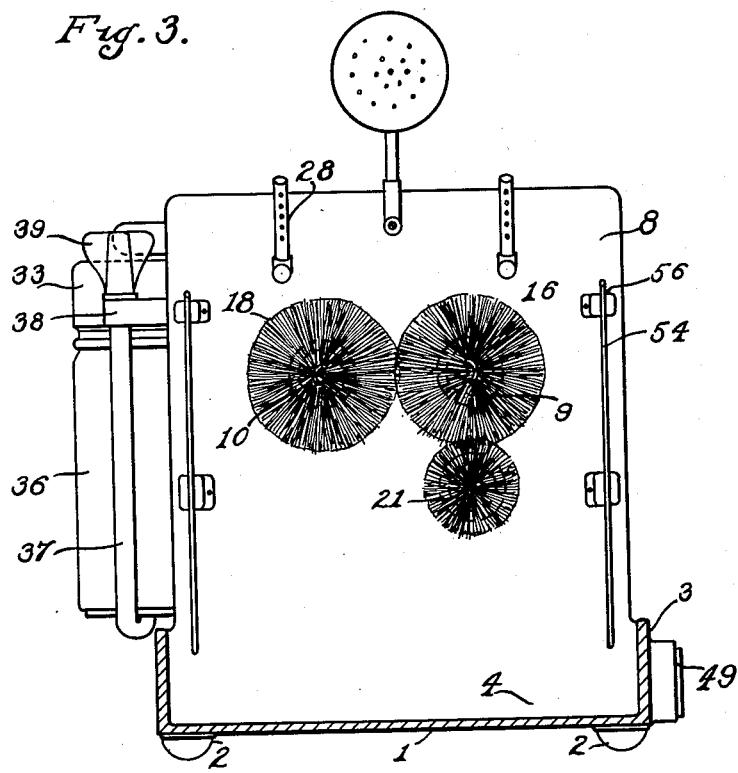
Fig. 3 is an end elevation.
Figure 4:
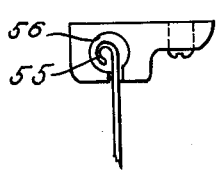
Fig. 4 is a detail view showing the means for supporting the splash guards for each side of the apparatus.
Figure 5:
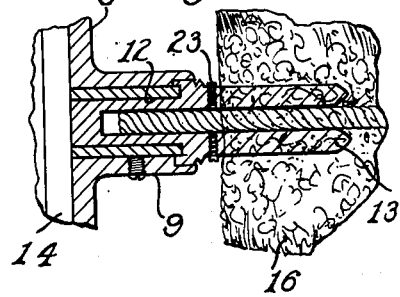
Fig. 5 is a detail section of a bearing support for one of the brushes.

In the embodiment illustrated I provide a base I provided with suitable rubber tipped supporting legs 2 and this base has side walls 3 extending upwardly therefrom to form a sink or basin 4. The base is preferably rectangular in general configuration and at one end and side is extended laterally to provide a supplemental well 5. This well, due to the configuration of the base, is offset to a considerable extent although the wall 6 thereof forms a continuation of the wall 3 of the base proper. This wall however which surrounds the well extends to a height considerably greater than the walls 3. At what may be termed the rear end of this base there extends upwardly therefrom an end plate 8 which extends to a considerable height and provides means for supporting, on one face thereof, the cleaning brushes for the articles to be cleaned and on the opposite face thereof the driving mechanism for the brushes, as well as the means for controlling the water supply to the apparatus and other accessories.

Extending forwardly from the plate 8 are a series of bosses 9, 10, and 11 forming bearing supports for the driving shafts of the brushes. The bosses 9 and 10 are in the same horizontal plane while the bosses 9 and 11 are in the same vertical plane. These bearing bosses support therein suitable hollow driving shaft sockets 12, each of which is the same, and which, at their forward ends, are provided with a series of forked projections 13. The sockets 12 extend through the base plate 8 to the rear face thereof and carry suitable meshing gearings forming a gear train 14 for driving the shafts 9 and 10 in opposite directions and also for rotating or driving the shaft sockets of the boss 11 in an opposite direction to that of the boss 9. This gear train is suitably driven from a driving mechanism preferably in the form of an electric motor 15 which is bolted to the rear face of the plate 8 and is enclosed in a suitable water-proof housing; this housing being fastened to the base plate and also providing a housing for the gear train. On each of the sockets 12 there is mounted a cleansing brush. One of these brushes 16 has its periphery concaved, being provided at its outer end with a tufted portion 17. The other brush 18, mounted in the same horizontal plane as the brush 16, has a similar tufted end 19 and the greater portion of its periphery convexed as at 20. The third brush 21, which is mounted immediately beneath the brush 16, is considerably smaller in diameter than either of the brushes 16 or 18 and it likewise is provided with a tufted end 22 and the periphery of the greater portion of its length is convexed to mate with the concaved portion of the brush 16. The brushes 16 and 18 rotate in opposite directions with the brush 16 rotating in a counter clockwise direction, and the brush 18 rotating in a clockwise direction, viewing the brushing from the rear of the apparatus. The brush 21, like the brush 18, rotates in a clockwise direction.

Each of these brushes preferably comprises a series of bristles which are twisted into a central wire shaft and this central wire shaft is projected beyond the bristle to take into a central opening in a shaft socket 12 to provide a bearing surface for the rear end of the brush. At the same time, the fingers or spaced-apart portions 13 pass into and through the bristles of the brush so as to insure the rotation of the brush with the hollow shaft 12. In addition, suitable set screws 23 pass through the fingers and into engagement with the ends of the brush shafts.

Cleansing water is supplied to each of the brushes 16 and 18 by suitable spray heads 24 and 25, in a position to spray water forwardly and over each of the brushes. These spray heads are preferably tubular in form and, as shown in Fig.

2, extend diagonally upwardly from the respective ends of supply pipes 26 and 27. These spray heads are provided with suitable spray openings which direct the water forwardly and downwardly upon the respective brushes and each of the spray heads is provided with an extension 28 which slips into the end of its respective pipe, making a readily disconnectible slip joint with the pipe so that the head may be readily removed from the pipe. Any suitable means may be resorted to for securing the head in the pipe, as by a bayonet joint or other device. It is rather important that the spray head be readily removable from the supply pipe as the spray openings are comparatively small and there is in certain communities where the water is "hard" a tendency for the spray openings to lime up. By providing a slip connection so that these heads may be removed, new heads may be supplied or a small quantity of muriatic acid or other acid of like characteristic may be dropped into the head for the purpose of loosening or cleansing out the accumulated lime around the spray openings.

Water is supplied to the spray heads from a suitable conduit 29 adapted to be connected with any water supply and preferably with a hot water supply. This conduit extends into a suitable block 30 secured on the rear face of the plate 8 and this block is provided with a regulating valve 31 for regulating the flow of the water from the supply. The delivery end of the block 31 is connected by a suitable pipe connection 32 with a head 33 having an ingress opening 34 and an egress opening 35. The head 33 is adapted to have clamped on its under face a soap powder container preferably in the form of a glass jar 36 in which suitable soap powder or other cleansing material may be maintained. It will be noted that both the openings 34 and 35 communicate with the container 36. The container 36 is held clamped in its position by a clamping rod 37 extending through a lug 38 on the head 33 and provided with a clamping wing nut 39. The egress opening 35 in the head communicates by means of a pipe conduit 40 with each of the supply pipes 26 and 27 for the spray heads.

Suitable valve mechanism (not shown) controls the flow of water through the head 33 and this valve mechanism in turn is manipulated by a handle 41 also adapted to control the electric motor circuit so that when the motor circuit is shut off the water supply will likewise be shut off.

It is obvious from the above construction that the supply of hot water through the conduit 29 passes through the soap container 36 and out through the soap container thence to the spray heads 24 and 25 which deliver over the brushes a spray of hot soapy water and as this supply is continuous so long as the machine is operating and glasses are being washed on the brushes, a continuous supply of fresh water is delivered to the brushes thereby preventing the wash water from becoming contaminated or greasy. A sufficient supply of water will flow down through the brush 16 to supply the brush 21 with cleansing fluid.

In addition to the above washing apparatus, I provide in the same structure a rinsing apparatus. My rinsing apparatus consists of a central spray nozzle 42 arranged in the center of a vertically movable spider 43 and a ring spray 44 mounted at a considerable height above the spider 43. This ring spray is in the form of a curved pipe and at one point in this ring spray there is provided a gap 45 which, it will be noted, is adjacent one of the side walls and to an extent is more or less clear of the brush 20. This type of rinsing apparatus is a type which is well known in the commercial art and it is not believed that it is necessary to enter into a detailed description thereof. Sufficient to say that the spider 43 is vertically movable and is springpressed upwardly and controls a flow valve mounted in the base 46 in such a manner that when a glass is placed in inverted position on the spider 43 and the glass and spider depressed, a spray of water will be delivered through the central spray 42 to the interior of the glass and an additional spray of water will be delivered to the ring 44 and thence to the exterior of the glass. This rinsing device is supplied with cold water from a suitable pipe connection 47 adapted to be led to the rear of the machine and coupled with a cold water supply.

In the use of the apparatus thus far described, the glass is first placed in an inverted position over the cold water rinsing device including the spray 42 and the spray 44, this thoroughly rinsing with cold water, both the interior and the exterior of the glass. This is found to be particularly advantageous and efficacious in the cleansing of glasses which have contained milk or milk products such as ice cream, sundaes and the like, or which have contained eggs or egg drinks. After the glass has been thoroughly rinsed in cold water it is then removed from the rinsing brushes and scrubbed on the brushes 16 and 18 or 21 and 16, depending upon the construction and size of the glass. Due to the rotative effect of the brushes, the glass is given a rotative movement, which may be resisted somewhat by the grip of the operator in order to produce a thorough scrubbing action of the brushes and it will be noted that if the glass is placed on either of the brushes 16 or 18 it will not only be scrubbed on the inside but will be scrubbed on the outside; having at the same time a constant spray of hot soapy water distributed thereon. If the glass is long and narrow and too small in diameter to receive either the brush 16 or 18 it may then be placed on the brush 21 which, it will be noted, is considerably smaller in diameter. However the same scrubbing effect is produced because it will be remembered that brushes 16 and 21 rotate in opposite directions. This scrubbing action on the part of the brushes thoroughly cleanses the glass both inside and out and removes any of the material which may tend to stick thereto, the material particularly where it is in the form of milk or the like having been first softened by its rinse in the cold water. If such material were immediately subjected to extremely hot water there would be a tendency on the part of the hot water to cook the material into a film on the glass and prevent its rapid removal therefrom. After the glass has been thoroughly scrubbed on the brushes and in the hot soapy water, it is then removed from the brushes and again given a cold rinse in the rinsing device heretofore described. The glass is thus not only chilled but when it is removed from the cold rinse has both on the inside and outside a film of cold water and when the glass is set aside to drain, without further cleansing, this cold water will drain off of the glass, carrying with it any of the magnesium, lime or other material which is so frequently found in water and particularly in "hard" water. The drying is one of draining rather than of evaporation, although eventually that water which does not drain off will of course evaporate. As a result of this method of washing glasses the glasses are delivered for use thoroughly cleansed free from any contamination of any character and in a crystal-clear condition.

The side wall 3 of the base is preferably provided with drain openings on each of three sides as at 48, 49, and 50 in order that drainage may be had from any desired point and in use those drain openings which are not desired may be plugged up by suitable corks or other means.

It sometimes occurs that the necessity arises for washing glasses which are too large in diameter to fit within the spray ring 44. Under these circumstances, it is only necessary to place the glass over the spray ring, and then by manipulating the handle 51 on the shaft 52 extending through the wall 7 of the rinsing well, operate the crank 53 for manipulating the valve controlling the spray nozzle 42 and the spray ring 44. It also becomes necessary under certain conditions to wash glasses having a handle and for this reason the gap 45 is provided in the ring as this gap permits of the insertion of the glass into the spray ring with the handle extending through the gap 45.

In order to prevent splashing during the cleansing operation, splash guards 54 are supported from the face of the plate. These guards are formed of sheet metal plates having their rear edges turned back upon themselves to form hinges 55 which fit in sockets 56 on lugs on the face plate 8. Additional splash guards 57 may be hooked over, by the hooks 58, the top edge of the wall 6 to prevent splashing during the rinse.

I claim as my invention:

1. In a glass washing machine, the combination with a receptacle base, having side walls extending upwardly therefrom to form a sink and a rear wall extending upwardly to form a supporting plate, of a plurality of brushes rotating in contiguous relation to one another supported from said plate and extending forwardly with their forward ends free, said base having a laterally offset well at its front end thereof and a rinsing structure mounted within said well.

2. In a glass washing machine, the combination with a receptacle base, having side walls extending upwardly therefrom and a rear wall extending upwardly therefrom to provide a supporting plate, a plurality of brushes supported by said plate and extending forwardly therefrom with their forward ends free, one pair of said brushes being arranged in the same horizontal plane and another pair of said brushes being arranged in the same vertical plane, said base having an offset portion to provide a well, said offset portion being on that side of the base opposite the vertically disposed brushes, and a rinsing device mounted in said well.

3. In a glass washing machine, the combination with a receptacle base, having side walls extending upwardly therefrom to form a sink and a rear wall extending upwardly therefrom to form a supporting plate, of a plurality of brushes supported from said supporting plate and extending forwardly with their ends free, means on the opposite side of said plate for rotating said brushes, said base having an offset portion to provide a well with the walls of said well extending higher than the remaining walls of the sink, and a spray device mounted in said well.

GEORGE T. FIELDING.